(12) United States Patent
Wahid

(10) Patent No.: US 9,266,754 B2
(45) Date of Patent: *Feb. 23, 2016

(54) SULFATE MOLECULE REMOVAL THROUGH INORGANIC OR DIVALENT ION NUCLEI SEEDING

(75) Inventor: M. Fazrie B. A. Wahid, Dyce (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 795 days.

This patent is subject to a terminal disclaimer.

(21) Appl. No.: 12/976,139

(22) Filed: Dec. 22, 2010

(65) Prior Publication Data

US 2012/0160777 A1   Jun. 28, 2012

(51) Int. Cl.
| | |
|---|---|
| C02F 1/52 | (2006.01) |
| C02F 101/10 | (2006.01) |
| C02F 103/08 | (2006.01) |
| C02F 103/10 | (2006.01) |
| C02F 5/02 | (2006.01) |

(52) U.S. Cl.
CPC .............. C02F 1/5236 (2013.01); C02F 5/02 (2013.01); C02F 2101/101 (2013.01); C02F 2103/08 (2013.01); C02F 2103/10 (2013.01); C02F 2209/003 (2013.01)

(58) Field of Classification Search
CPC .................................................. C02F 1/5236
USPC ........................................................ 210/723
See application file for complete search history.

(56) References Cited

U.S. PATENT DOCUMENTS

| | | | | |
|---|---|---|---|---|
| 3,668,087 A | * | 6/1972 | Fabiano | 205/512 |
| 5,324,525 A | * | 6/1994 | Sakuma et al. | 424/602 |
| 5,603,838 A | * | 2/1997 | Misra et al. | 210/665 |
| 6,241,893 B1 | * | 6/2001 | Levy | 210/660 |
| 2003/0080066 A1 | * | 5/2003 | Vohra et al. | 210/714 |

(Continued)

FOREIGN PATENT DOCUMENTS

| | | |
|---|---|---|
| JP | 61101416 A | 5/1986 |
| WO | 2009030903 A2 | 3/2009 |
| WO | 2009065858 A1 | 5/2009 |
| WO | 2010138583 A1 | 12/2010 |

OTHER PUBLICATIONS

A Review of Sulfate Removal Options for Mine Waters—RJ Bowell—SRK Consulting, Windsor Court, 1 Windsor Place, Cardiff CF103BX Wales, 2004.

(Continued)

*Primary Examiner* — Tony G Soohoo
*Assistant Examiner* — Peter Keyworth
(74) *Attorney, Agent, or Firm* — Jeremy D. Tillman; Rachel E. Greene; Tim Currington

(57) ABSTRACT

Methods and apparatus of embodiments of the invention relate to treating water including contacting a liquid stream with a source comprising inorganic and/or divalent ions and separating the stream into an effluent and a fluid comprising less sulfate than the stream, wherein the effluent comprises more sulfate and more inorganic and/or divalent ions than the stream. Methods and apparatus relate to treating water including a reaction unit comprising an inlet for feed fluid and an inlet for inorganic and/or divalent ions and a separator unit comprising an inlet for output from the reaction unit, an outlet for effluent, and an outlet for fluid comprising less sulfate than the feed fluid. Some embodiments include introducing the fluid comprising less sulfate than the stream into a subterranean formation.

8 Claims, 1 Drawing Sheet

(56) References Cited

U.S. PATENT DOCUMENTS

| | | |
|---|---|---|
| 2005/0098499 A1 | 5/2005 | Hussain |
| 2005/0220698 A1 | 10/2005 | Ghosh et al. |
| 2008/0107487 A1* | 5/2008 | Matthews ................. 405/129.1 |
| 2009/0065431 A1 | 3/2009 | Bakke et al. |
| 2009/0211960 A1 | 8/2009 | Nilsen et al. |
| 2010/0163472 A1* | 7/2010 | Thiers et al. ................. 210/177 |

OTHER PUBLICATIONS

Treatment of Sulphate in Mine Effluents—International Network for Acid Prevention—Lorax Environmental—Oct. 2003.

International Search Report and Written Opinion issued in PCT/US2011/065751 on Aug. 24, 2012, 14 pages.

* cited by examiner

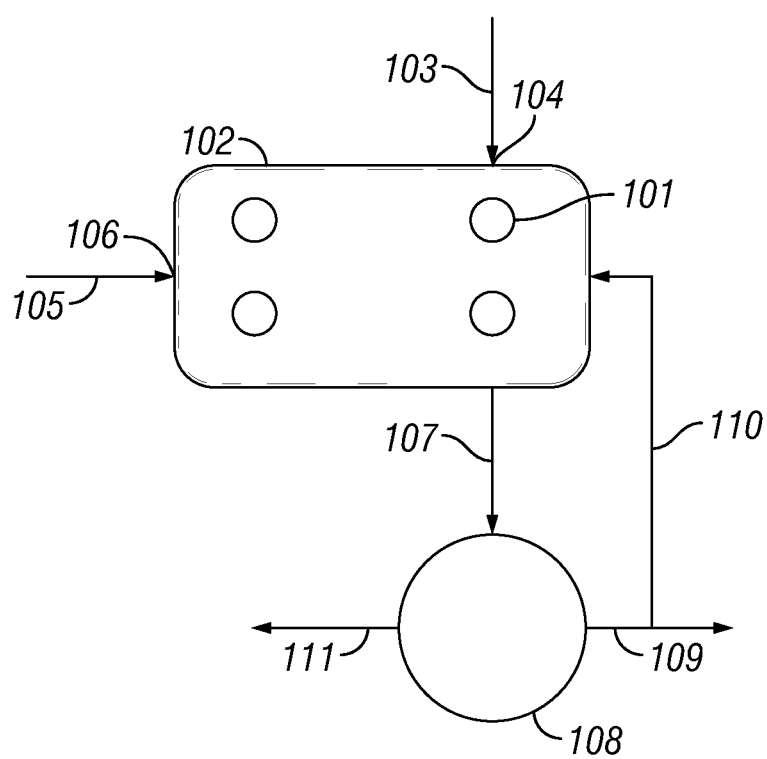

SULFATE MOLECULE REMOVAL THROUGH INORGANIC OR DIVALENT ION NUCLEI SEEDING

BACKGROUND

Hydraulic fracturing uses a large volume of water that is selected for its chemical properties. The demand for this type of well services has increased over the past decade, especially because of its successful application for difficult conditions. Horizontal wells are often standard, requiring as much as 4.2 million gallons of water per well in as many as 6 to 9 fracture stages. Because of environmental concerns and fresh water availability, salt water and the flowback and produced water are collected and used for subsequent fracture treatments.

Scale formation due to seawater injection into an oilfield reservoir often causes significant impairment to production. In some cases, sulfate reduction plants are used for example using membrane technologies/reverse osmosis, which can be economically expensive. For cases where seawater is used as a base liquid during stimulation operations, installing a sulfate removal plant can be uneconomical.

Various different methods can be applied to reduce water salinity and to prevent bacteria growth and reduce operational expenses related to corrosion prevention, remediation of corrosion effects, and remediation of emulsion-like produced fluids. Historically, removing sulfate is performed by using a membrane (or other filtration techniques) to filter out the sulfate molecules whereby the feed seawater are partially desalinated. Also, previous methods remove the sulfate ions through filtering technologies, rather than through precipitating out unwanted metal ions by reacting it with non metal ions. While some solutions are technically feasible, the economics and operational requirements are quite costly. A simple, cheap, and highly efficient technology to remove sulfate from a stream of saline liquid that is compatible with other fluid additives and that is easily transportable is needed.

FIGURE

FIG. 1 is schematic diagram of a system to reduce the salinity of water for use in the oil field services industry.

SUMMARY

Methods and apparatus of embodiments of the invention relate to treating water including contacting a liquid stream with a source comprising inorganic and/or divalent ions and separating the stream into an effluent and a fluid comprising less sulfate than the stream, wherein the effluent comprises more sulfate and more inorganic and/or divalent ions than the stream. Methods and apparatus relate to treating water including a reaction unit comprising an inlet for feed fluid and an inlet for inorganic and/or divalent ions and a separator unit comprising an inlet for output from the reaction unit, an outlet for effluent, and an outlet for fluid comprising less sulfate than the feed fluid. Some embodiments include introducing the fluid comprising less sulfate than the stream into a subterranean formation.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors have disclosed and enabled the entire range and all points within the range.

The removal of sulfate ions uses a simple and cheap technique including seeding the seawater rich in sulfate ion (or liquid rich in sulfate ions) with divalent ions to form barite crystal (or divalent ion based crystals) in a reaction vessel, then passing the output through a separation unit. Chemicals that can be used for seeding include barium chloride, calcium chloride, strontium chloride, magnesium chloride, radium chloride, beryllium chloride, barium fluoride, calcium fluoride, strontium fluoride, magnesium fluoride, radium fluoride, beryllium fluoride, barium bromide, calcium bromide, strontium bromide, magnesium bromide, radium bromide, beryllium bromide, barium iodide, calcium iodide, strontium iodide, magnesium iodide, radium iodide, beryllium iodide, and ferrous chloride.

In some embodiments, throughout the whole system, an anti adhesion coating is applied so that the inorganic materials, or scales (e.g. barite or calcium sulfate, or other types of deposits crystals) formed will not stick onto the surfaces of the equipment and can be removed downstream at the separation unit. This technique is also applicable for the removal of all inorganic crystalline materials. This technology then allows the conversion of seawater or saline water into less saline fluid and is particularly useful where fresh water or access to fresh water is limited. This method is applicable in the oil industry market, water industry market, desalination market, and food industry market.

The process is shown in FIG. 1. The reactions are controlled through mixing apparatuses 101 (e.g. propellers, rods or any other mixing tools suitable) in reaction unit (s) 102 and residence time to allow optimal reactions to occur. Problems with the formed crystalline structures adhering to surfaces and impacting the separation process are mitigated by coating the inside of all the equipments with anti stick agents (e.g. chemicals, polymers, nano materials).

A key parameter is to coat the entire, or part of the equipment with anti-adhesion or coating agents prior to use. The feed fluid 103 (feed 1), for example, seawater fluid containing sulfate ions, are fed into the reaction unit (s) (vessel) 102 through an inlet (or several inlets) 104. Divalent ions (feed 2) 105 of equal or larger moles (or molar mass) than that of sulfate ions (present in feed fluid 103) are fed into the reaction unit(s) 102 from a different inlet 106, and the two feed streams (feed 1 and feed 2) are mixed in the reaction unit(s) 102. Feed 2 (105) can be either in liquid form or solid form, e.g. powder. When mixed in the reaction unit(s) 102, the sulfate ion from feed 1 (103) will precipitate with the divalent ions introduced from feed 2 (105) to a liquid stream containing an inorganic precipitate and possessing a significant reduction in sulfate concentration. Liquid stream 107 contains crystalline barite or other inorganic materials.

Reactions to form the inorganic precipitate following the mixing of feeds 1 and 2 in the reaction vessel usually occur instantaneously, or within a set residence time due to kinetics effect. The residence time of the mixed feed are designed as such that the maximum amount of sulfate from feed 1 have been removed from the liquid phase through precipitation of inorganic solids material. The liquid stream 107 from the reaction vessel 102 is then fed out into separator unit(s) 108, to separate the liquids and crystalline solids formed into an output solid stream 111 and an output liquid stream 109. A metering system, or in situ analyses, or time lapse analyses can then be carried out on the output liquid stream 109 to evaluate the concentration of sulfate present. Depending on the concentration of sulfate present, this output liquid stream 109 from the separator may be returned by line 110 into the vessel 102 should the concentration of sulfate molecules need to be reduced further. This will then allow any sulfate ions still present in the liquid stream 107 to be removed in the reaction vessel 102 through precipitation process following further mixing with Feed 2 (105). The final result would be an output liquid stream 109 with a significantly reduced sulfate ion concentration.

The process may be controlled by tailoring agitation, residence time, temperature, and/or pressure of the system or components of the system. Some embodiments may benefit from compartments in the reaction vessel to facilitate surface area, agitation, and crystallization optimization. Types of reaction vessel or unit(s) that may be used by this process follow.

Fiber reinforced pressure vessels
Vacuum pressure vessels
Mixing vessels
Jacketed vessels (including thermal jacketed)
Limpet coil in body flange
Welded types
Top open
Top dish
Ribbon blender and mixer
Glass based vessels
Cryogenic reaction vessels
Teflon lined reaction vessel
Polymer lined reaction vessels
Stainless steel reaction vessel
Alloy based reaction vessel
Polymer lined vessel
Internal spiral mixing system
Rubber sealed glass
Types of mixing apparatus 101 that may be used by this process follow.
Propeller(s)
Impeller(s)
Anchor type agitator(s)
Blade/turbine(s)
Rotating rod(s)
Magnetic mixer
Pitch blade turbine
Helical agitators
Single and multiple motion mixing equipments
Reaction control equipment that may be used by this process follow.
Silicone
Speed homogenizer
Heating/or cooling equipments
Electrical bar heating
Steam heating
Conduction
Freon
Conduction oil hydronic hearing
Pressurization (controlled and non controlled)
Computerized/manual control on both pressure and temperature Separation unit(s) may employ gravity settling, cyclone separation, mesh, filters, or other equipment.

Inorganic scale typically adheres to metallic surfaces by adsorption through an ionic bond with the metal ions on the surface. The key to stop the formed inorganic scale to stick onto the surfaces of the vessel is then suggested via three main methods:
1. Use of anti-agglomerates
2. Use of a non metal surface for the reactor
3. Line the surface with an inert chemical/particle that does not allow bonding to occur The preferred anti-scaling deposition on a metal surface involves surface modification. Types of coating materials that are also effective include the following.

Special surface finishing
Glass
Rubber
Fiber glass
Polytetrafluoroethylene (PTFE), including etched, tubes, sheets, hose types PTFEs
Perfluoroalkoxy
Fluorinated ethylene propylene
Magnesium coating
Teflon
Poeton
Poly(dimethyl siloxane), including modified chains
nanotubes coatings
silicone resins
plastics and modified plastics, including polycarbonate resin thermoplastics
Alumina coatings This technology allows the conversion of seawater or saline water into less saline fluid. A particular benefit of this technology is the ability to produce fresh water (or low salinity water) from seawater (or saline water) economically and in large quantities when access to fresh water is limited or none existent. This technology then allows the conversion of seawater or saline water into less saline fluid and is particularly useful where fresh water or access to fresh water is limited. Embodiments of this invention are applicable in the oil industry market, water industry market, desalination market, food industry market.

In the oil industry, examples include the following.
1. This application is particularly useful for the oil industry where injection of seawater in a hydrocarbon reservoir is required either for reservoir pressure maintenance, hydrocarbon sweep or other reasons. As the injected seawater mixes with formation water, particularly in areas of risks (e.g. near the producer wells, inside the producer wells, pipeline or subsea pipelines, wellhead template, topside equipment), scale (inorganic deposits) may form and cause blockage. The use of this technology will ensure that no inorganic deposits will form as a building block required to form inorganic deposits (e.g. sulfate ions) have been removed prior to seawater injection.

2. This application is particularly useful for the oil industry where seawater is used as a base fluid for stimulation operations, for example in hydraulic fracturing fluids, or acidization, or scale squeeze treatment. In essence, any well treatment that usually uses seawater as a base fluid will benefit from this technology. For example, if the treatments are carried out without removing the sulfate ions from the base fluid, there is a real risk that upon injection of the seawater into the formation and mixes with the formation water, scale (inorganic deposits) will form and cause formation damage. This technology removes the risk through removal of the sulfate ions prior to injection.

3. This application is particularly useful for the oil industry where low salinity water is used for Enhanced Oil Recovery (EOR). For example, selective ions can be removed from the fluid in the inlet stream (feed 1) through mixing with suitable divalent or monovalent ions introduced in feed 2 to form precipitate(s). The outcome would be a fluid stream with only selected ions present in the liquid phase, sufficient for use for EOR processes where a low salinity fluid is required.

For the desalination, food or water industry market, the technology can be used to remove selected ion molecules from the inlet stream (seawater, or other saline water source) until a low salinity fluid akin to fresh water or such is produced at the outlet stream. The technology allows full control of the quality of water that is produced in the outlet stream. The "reduced salinity water" from the outlet stream can then be used for example as a source of potable water, cleaning water, washing up water or for water feed for plants (agriculture), animals (farming) and in the food and beverages industry.

Some of the advantages of this process are briefly listed here.

1. The sulfate molecules are removed through the formation of a stable and solid crystalline structure.
2. The equipment is coated with anti sticking agents (polymer, nano particles or any other materials that can reduce or eliminate scale from adhering onto surfaces)
3. The inlet streams mixing in the reaction vessel may be fully controlled
4. The reaction rates occurring in the reaction vessel can be controlled
5. The process of ion removal can be carried out as a batch or continuous reaction process.
6. The final lower concentration of sulfur containing materials makes the proliferation of bacteria that require sulfur less likely. That is, embodiments of this invention remove the food supply of the bacteria and thus reduce the need for biocide.

Other Fluid Additives

The carrier fluid, such as water, brines, or produced water, may contain other additives to tailor properties of the fluid. Rheological property modifiers such as friction reducers, viscosifiers, emulsions, stabilizers, solid particles such as proppant or fibers, or gases such as nitrogen may be included in the fluid. The fluid may include viscosity modifying agents such as guar gum, hydroxyproplyguar, hydroxyelthylcellulose, xanthan, or carboxymethylhydroxypropylguar, diutan, chitosan, or other polymers or additives used to modify viscosity for use in the oil field services industry. Water based fluids may include crosslinkers such as borate or organometallic crosslinkers. In some embodiments, the fluid may contain viscosity modifying agents that comprise viscoelastic surfactant. Viscoelastic surfactants include cationic, anionic, nonionic, mixed, zwitterionic and amphoteric surfactants, especially betaine zwitterionic viscoelastic surfactant fluid systems or amidoamine oxide viscoelastic surfactant fluid systems.

Applications

The fluid may be used as a fracturing fluid, drilling fluid, completions fluid, coiled tubing fluid, sand control fluids, cementing operations fluid, fracturing pit fluid, or onshore or offshore water injector fluid, or any other fluid that is introduced into a subterranean formation primarily for the recovery of hydrocarbons. The fluid is introduced to the subterranean formation by drilling equipment, fracturing equipment, coiled tubing equipment, cementing equipment, or onshore or offshore water injectors. During, before, or after the fluid is added to a subterranean formation, the formation may benefit from fracturing, drilling, controlling sand, cementing, or injecting a well.

An oil field services application of these methods may include delivery of the fluid to the following mechanical equipment. The fluid may be delivered to the low pressure side of the operation, that is, into any low pressure hose, connection, manifold, or equipment; before or during treatment. Examples of the location for addition include into pond, pit, or other water containment source; into inlet hose/manifold of water tanks (upstream of water tanks); frac tanks—all together or separate; into water tanks (frac tanks) themselves; into hose/manifold of outlet side of water tanks; into batch mixing unit; into hose/manifold in between batch mixing unit and blender; into blender itself; into exit side of blender (upstream of fracturing pumps); hose/manifold; directly into low pressure side of pump manifold (missile). The fluid may be delivered to the high pressure side of an operation including into any high pressure iron, anywhere. Pumps that may be used, either solo or combined, include positive displacement pumps, centrifugal pumps, and additive pumps. The fluid may be added to the water stream in any way. (i.e. pour from a bucket, pump it into the water, etc.).

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for treating water, comprising:
contacting, with mixing, a liquid stream of water containing sulfate with a source comprising inorganic and/or divalent ions;
separating the stream into an effluent and a fluid comprising less sulfate than the stream; and
evaluating a concentration of sulfate in the fluid comprising less sulfate and, if the concentration of sulfate in the fluid comprising less sulfate needs to be reduced, returning the fluid comprising less sulfate to again contact the source comprising inorganic and/or divalent ions,
wherein the effluent comprises more sulfate and more inorganic and/or divalent ions than the stream, and wherein the contacting and separating are performed in equipment with surfaces that comprise an anti-adhesion coating that prevents formation of sulfate on a surface of the equipment.

2. The method of claim 1, wherein the inorganic and/or divalent ions comprise barium chloride.

3. The method of claim 1, wherein the contacting further comprises forming solid precipitates.

4. The method of claim 1, wherein the separating comprises density separation.

5. The method of claim 1, wherein the separating comprises separating solid precipitates from the stream.

6. The method of claim 1, further comprising measuring the sulfate concentration in the effluent.

7. A method for treating water, comprising:
contacting a liquid stream of water containing sulfate with a source comprising inorganic and/or divalent ions in a reactor containing a mixing apparatus;
separating the stream in a separator unit into an effluent and a fluid comprising less sulfate than the stream; and
evaluating a concentration of sulfate in the fluid comprising less sulfate and, if the concentration of sulfate in the fluid comprising less sulfate needs to be reduced, returning the fluid comprising less sulfate to the reactor to again contact the source comprising inorganic and/or divalent ions,
wherein the effluent comprises more sulfate and more inorganic and/or divalent ions than the stream, and
wherein the contacting and separating are performed in equipment with surfaces that comprise an anti-adhesion coating that prevents formation of sulfate on a surface of the equipment.

8. The method of claim 7, further comprising introducing the fluid comprising less sulfate than the stream into a subterranean formation.

* * * * *